US012027329B2

(12) United States Patent
Dengler et al.

(10) Patent No.: US 12,027,329 B2
(45) Date of Patent: Jul. 2, 2024

(54) ELECTRICAL SWITCHING DEVICE

(71) Applicant: Siemens Energy Global GmbH & Co. KG, Munich (DE)

(72) Inventors: Christian Dengler, Falkensee (DE); Sascha Froebel, Berlin (DE); Roland Monka, Berlin (DE); Marcel Weigel, Berlin-Blankenburg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 195 days.

(21) Appl. No.: 17/635,079

(22) PCT Filed: Jul. 13, 2020

(86) PCT No.: PCT/EP2020/069762
§ 371 (c)(1),
(2) Date: Feb. 14, 2022

(87) PCT Pub. No.: WO2021/028138
PCT Pub. Date: Feb. 18, 2021

(65) Prior Publication Data
US 2022/0293370 A1 Sep. 15, 2022

(30) Foreign Application Priority Data
Aug. 13, 2019 (DE) ..................... 10 2019 212 109.8

(51) Int. Cl.
*H01H 33/70* (2006.01)

(52) U.S. Cl.
CPC ............................... *H01H 33/7015* (2013.01)

(58) Field of Classification Search
CPC .... H01H 33/7015; H01H 33/91; H01H 33/90; H01H 2033/908; H01H 2033/906; H01H 31/003; H01H 31/00
USPC ... 218/51, 53, 55, 57, 59, 61, 66–68, 86, 88
See application file for complete search history.

(56) References Cited

U.S. PATENT DOCUMENTS

| | | | | |
|---|---|---|---|---|
| 5,589,673 | A | 12/1996 | Lehmann et al. | |
| 7,122,758 | B2 * | 10/2006 | Schweizer | H01H 31/003 218/79 |
| 8,232,497 | B2 | 7/2012 | Gregoire et al. | |
| 8,299,385 | B2 * | 10/2012 | Bae | H01H 33/70 218/66 |
| 2010/0326958 | A1 | 12/2010 | Gregoire et al. | |
| 2014/0014623 | A1 | 1/2014 | Kehr et al. | |

FOREIGN PATENT DOCUMENTS

| | | | |
|---|---|---|---|
| CN | 103443894 | A | 12/2013 |
| DE | 10322876 | A1 | 12/2004 |
| EP | 3309810 | A1 | 4/2018 |
| EP | 3419039 | A1 | 12/2018 |
| JP | 2016173899 | A | 9/2016 |
| WO | WO 9320573 | A1 | 10/1993 |
| WO | WO 2019024978 | A1 | 2/2019 |

* cited by examiner

*Primary Examiner* — William A Bolton
(74) *Attorney, Agent, or Firm* — Laurence A. Greenberg; Werner H. Stemer; Ralph E. Locher

(57) ABSTRACT

An electrical switching device includes a switching path and a flow device with a control valve. By way of the flow device, a fluid can flow on the switching path. The control valve additionally has a valve body. The valve body is pressed into a sealing position by the flow pressure of the flowing fluid.

9 Claims, 11 Drawing Sheets

ELECTRICAL SWITCHING DEVICE

SPECIFICATION

Field and Background of the Invention

The invention relates to an electrical switching device comprising a switching path and a flow device with a control valve for applying flow to the switching path, the control valve comprising a movable valve body.

An electrical switching device is known, for example, from the international publication WO 2019/024978 A1. In said publication, a flow device is assigned to a switching path of the switching device. The functional operation of the flow device is controlled by means of a control valve. To this end, the control valve comprises a movable valve body which is movable in a manner which is assisted or blocked by a spring. In the case of a control valve which is constructed in this way, the response behavior is to be evaluated as comparatively sudden. Accordingly, pulses can occur which influence the electrical switching device in its entirety. Therefore, the functional operation of the control valve is to be taken into consideration in the case of the design of the switching device. Furthermore, the known construction has the disadvantage that signs of fatigue occur with an increasing number of actuations of the control valve. On account of signs of fatigue, the response behavior of the control valve can change, as a result of which variable states can in turn occur, for example in the switching path of the electrical switching device.

SUMMARY OF THE INVENTION

An object of the invention which therefore results is to specify an electrical switching device which has a stable switching behavior even after a multiplicity of switching operations.

In the case of an electrical switching device of the type mentioned at the outset, the object is achieved according to the invention by virtue of that fact that the valve body is pressed into a sealing position by way of the flow pressure of a flowing fluid.

An electrical switching device serves to disconnect or establish an electrically conducting flow path phase in a phase conductor track. To this end, the electrical switching device comprises a switching path which preferably extends between switching contact pieces which are movable relative to one another. Both in the case of switching on, that is to say in the case of an approach of the switching contact pieces and galvanic contacting thereof, and in the case of switching off of the switching device, that is to say in the case of galvanic disconnection and removing of the switching contact pieces from one another, discharge events can occur in the switching path. In the case of a switch-on operation, said discharge events are called, for example, pre-arcing. In the case of a switch-off operation, said discharge events are called, for example, disconnection arcs. Discharge events of this type are associated with elevated thermal loads which occur in the switching path. On account of the thermal loads, for example, the switching contact pieces or else further components of the electrical switching device are subject to increased wear. By means of a flow device, the switching path can be subjected to a fluid flow. The flow device can, for example, inject a fluid into the switching path or discharge a fluid from the switching path, with the result that cooling is brought about in the switching path. To this end, for example, the flow device can comprise a piston/cylinder arrangement, it being possible for a positive or negative pressure for generating a corresponding flow to be brought about by way of a relative movement of piston and cylinder. The functional operation of the flow device should take place here in a manner which is synchronized with respect to a relative movement of switching contact pieces of the switching device. Depending on the state of the switching path, that is to say depending on the spatial position of the switching contact pieces which are positioned relative to one another, applying of flow to the switching path can be performed. Switching contact pieces which are movable relative to one another and elements of the flow device (cylinder/piston) which are movable relative to one another can be actuated in a manner which is synchronized with respect to one another. As a result, a synchronous relative movement can be brought about in the flow device, for example, in a manner which is dependent on the progress of a relative movement of the switching contact pieces.

Depending on the switching operations to be controlled, an application of flow to the switching path can be advantageous both in the case of a switch-on operation and in the case of a switch-off operation. An injection of the switching path can be provided as required, for example, in the case of a switch-off operation, and an extraction of a fluid from the switching path can be preferred, for example, in the case of a switch-on operation. It can also be provided, however, that the flow device is to take effect merely in the case of a switch-on operation or merely in the case of a switch-off operation.

Depending on requirements, a control valve can be provided which permits an effect of the flow device, for example, merely in the case of a switch-on operation or a switch-off operation. By means of the control valve, for example, a relief opening of the flow device can be opened or closed as required, and a generation of a positive pressure or a negative pressure in the flow device can thus be prevented or brought about. A flowing fluid can pass through the relief opening which is released or blocked in a manner which is controlled by the control valve. Here, the flowing fluid generates a flow pressure. Said flow pressure can be utilized to press the valve body into a sealing position, that is to say to block the relief opening. The valve body can preferably be mounted in a freely oscillating manner, for example in the manner of a clearance fit. The valve body can be arranged, for example, so as to be movable (oscillating) between a first stop and a second stop. A free movement can take place in a manner which is free from external forces which act on the valve body.

The relief opening can comprise a channel. The valve body can be attached movably within the channel or on an orifice of the relief opening. A stop can prevent the valve body from exiting the channel. Therefore, the valve body can be arranged in a shielded manner within the channel. Dielectric shielding is advantageous here, with the result that the dielectric properties are maintained on the switching device in the case of the use of a movable control valve.

The flow device can take effect when the relief opening is blocked. A positive or negative pressure can thus be generated in the flow device, and a corresponding application of flow to the switching device can be achieved. Engaging of the valve body into its sealing position advantageously takes place by way of the flow pressure. The utilization of the flow pressure for actuating the valve body has the advantage that an actuation of the valve body can be brought about virtually without wear. In addition, the force which acts on the valve body and therefore the sealing seat thereof in the control valve or a release therefrom are boosted as the flow pressure increases. For example, the valve body is movable, for example displaceable or foldable, with play, with the result that a smooth-running actuation of the valve body can be brought about even in the case of low flow pressures. In this way, an actuation of the control valve can already be triggered at an early time. Thus, for example, initially partial damming of the relief opening is possible. The control valve can have a soft characteristic, that is to say the valve body can bring about comparatively slow damming of the relief opening and therefore a (slow) change of the pressure in the interior of the flow device at a comparatively low change speed in a manner which is dependent on the change speed of the flow pressure. This accordingly results in a gentle response behavior of the control valve, as a result of which sudden pressure changes are avoided. The electrical switching device is thus loaded with additional forces only to a small extent in the case of engaging or disengaging the valve body. A soft decrease in the blocking action of the valve body can also take place in the case of a reversal of the flow direction and therefore the reversal of the flow pressure on the valve body. Furthermore, additional actuating means such as springs for actuating the valve body can be dispensed with as a result of the utilization of the flow pressure. This can lead to a freely movable valve body within set limits (stops). Accordingly, a virtually fatigue-free actuation of the valve body can be assumed. The control valve is seated, for example, in a channel which can be formed, for example, by way of a relief opening on a cylinder or a piston of the flow device. A flow pressure of a fluid which flushes around or through the flow device can be brought about by way of a differential pressure between the interior and the exterior of the flow device. Here, the flowing fluid should preferably be of electrically insulating configuration. Said electrically insulating fluid can also serve for electrical insulation of the switching path and also an application of flow to the switching path. Fluorine-based fluids such as sulfur hexafluoride, fluoronitriles, fluoroketones or fluoroolefins can be used, for example, as electrically insulating fluids. Furthermore, however, nitrogen-based fluids such as, for example, mixtures with oxygen (for example, purified air) can also be used as fluid. The fluids preferably have a gaseous form here, but it can also be provided that the fluids are present in liquid form.

A further advantageous refinement can provide that the valve body can be moved in the manner of a clearance fit between a first stop and a second stop.

The valve body can be guided movably, for example, in the manner of a clearance fit. The valve body can thus, for example, be configured in the manner of a piston which can oscillate in a freely movable manner in a channel. Here, the free movability of the valve body is limited by means of a first and a second stop. As a result, the valve body remains between a blocked position and an open position, and can be pressed from the first to the second stop or from the second to the first stop in a manner which is dependent on the flow pressure which acts between the first stop and the second stop and vice versa. The design of the clearance fit can vary depending on the expected flow pressure. It can be provided on a first stop that the valve body is pressed into a sealing position on the first stop, whereas the valve body configures the control valve to be open in a position on the second stop. Depending on the configuration of the stops with corresponding recesses, projecting edges or shoulders, a gap on the valve body can be opened or closed. It can also be provided, for example, that a channel, in which the valve body can be moved, has a changing cross section, as a result of which there is a sealing seat in the case of the valve body bearing against the first stop, and there is an open state of the control valve in the case of bearing against the second stop. The first stop can comprise, for example, a dimensionally complementary receptacle for the valve body. In the case of the valve body bearing against the first stop, the control valve is closed. Recesses, for example teeth or notches, can be provided on a second stop, as a result of which a passage of a fluid flow between the second stop and the valve body is enabled. The valve body itself can comprise a through opening (transfer channel) which is dammed in the case of contact with the first stop and is open in the case of contact with the second stop.

The valve body can be shaped, for example, in the manner of a disk/cylinder, but it can also be provided that further shapes are provided for the valve body. Thus, for example, the valve body can also be shaped in the manner of a ball or a cone. A sealing seat or a passage can be formed on the first and second stop by way of an accordingly corresponding design of the stops or a (section of a) channel extending between the stops.

A further advantageous refinement can provide that the valve body comprises a through opening which can be blocked by way of one of the stops.

A through opening (transfer channel) in the valve body makes it possible for simplified structures to be used for the stops. Depending on the shaping of the stops, a through opening in the valve body can be blocked in the case of contact, for example, with the first stop (for example, sealing position), whereas the through opening of the valve body is open in the case of the valve body bearing against the second stop. In this way, there is a low-wear construction, in order to achieve a constant response behavior at identical flow pressures after a multiplicity of switching operations of the control valve. In the case of the utilization of a valve body with a cylindrical shape or rotational shape, the through opening can preferably extend substantially parallel to the cylinder axis or rotational axis.

A further advantageous refinement can provide that the valve body is elastically deformable.

As a result of an elastic valve body, the sealing seat or the sealing position of the valve body can be implemented in a simple form. An elastic valve body can be pressed into a sealing position in a manner which is dependent on the flow pressure. The valve body can again be pressed into a sealing position even after a multiplicity of switching operations of said valve body. The valve body can be subjected to a deformation in order to bear against or be removed from a stop. An elastic valve body can be formed, for example, by way of the utilization of an elastomeric disk or an elastomeric plate. It can also be provided, however, that, for example, a spherical or conical elastic valve body is used.

A further advantageous refinement can provide that the valve body is fixed spatially in an at least punctiform manner.

A punctiform spatial fixing for the valve body makes it possible, in particular in the case of the utilization of an elastic valve body, for a deformation to be brought about or permitted in a targeted manner. In this way, firstly the control behavior of a smooth-running valve body which can be moved in a manner which is dependent on the flow pressure, in particular, between a first and a second stop can be influenced. Furthermore, a punctiform fixing makes it possible for the degree of freedom of the valve body to be restricted and thus for the reproducibility of its movement within a flowing medium or in a manner brought about by a flow pressure to be controlled in a simplified manner. The valve body can be fixed, for example, centrally or in an edge region, as a result of which, for example, a preferred deformation is stimulated. In the case of the utilization of an elastically deformable valve body, in particular, the locking and unlocking behavior of the valve body can thus be controlled in an improved manner. An elastic valve body can be arranged in front of a relief opening and, for damming purposes, can bear against a wall which delimits the relief opening, in a manner which spans the relief opening. In order to open the relief opening, the elastic valve body can lift off from the wall under deformation.

A further advantageous refinement can provide that a stop fixes the valve body spatially.

If a stop is utilized to position the valve body, the latter can move away from the stop in a targeted manner, but only to the extent permitted by an, in particular, punctiform spatial fixing. The valve body can flip over or fold over, for example, by it being subjected to the flow pressure in the manner of a barrier and being pressed against the first or against the second stop in a manner which is dependent on the flow pressure. If a stop is then utilized to fix the valve body spatially, said valve body can be positioned in a simple form between the first and the second stop and a fatigue-free actuation of the valve body can be performed.

A further advantageous refinement can provide that a stop comprises a convex stop face for the valve body.

A stop can provide a convex stop face for the valve body. Pressure marks or notch marks are avoided during contact of the valve body by way of the convex configuration of the stop face. As a result, the durability of the valve body is increased and, furthermore, the sealing functions of the valve body are maintained, since notches or pressure marks or any other type of deformations which form undesired bypasses are prevented. The convex stop face can be, for example, a portion of a spherical cap. It can also be provided, however, that the convex stop face is configured in the manner of a portion of a cylindrical surface. In the case of central positioning of the valve body on a stop face, in particular, a spherical cap-like convex stop face can be used, as a result of which an all-round movement of the valve body can be permitted around the punctiform fixing of the valve body. The movability of the valve body of a convex stop face which is configured in this way is restricted uniformly and on all sides. In the case of lateral containing of a valve body, an approximately cylindrical surface-shaped configuration of the stop face is appropriate, as a result of which a flap-like movement of the valve body can be enforced. In the case of the utilization of an elastically deformable valve body, the deformation can be assisted by way of the convex shaping of the stop face. A sharp-edged deformation of the valve body can be counteracted.

Furthermore, it can advantageously be provided that the control valve is positioned in a stationary manner relative to the switching path.

The switching path can be limited by way of switching contact pieces which can be moved relative to one another. The control valve can remain at rest in a stationary manner regardless of the relative position of the switching contact pieces. In the case of the utilization of a stationary switching contact piece which limits the switching path, the control valve can remain at rest relative to said stationary switching contact piece. As a result, the mass to be moved of an electric switching device with switching contact pieces which can be moved relative to one another is reduced. At the same time, the control valve is protected against mechanical vibrations on account of movements and the like. In this way, a reliable function of the control valve can be ensured. Even in the case of low flow pressures, there is thus an actuation of the valve body of the control valve, since a superimposition of movements is avoided and accelerations which occur are kept away from the valve together with the valve body.

A further advantageous refinement can provide that the electrical switching device is a grounding switch, in particular a fast-acting grounding switch.

A grounding switch has a switching path which serves to load a phase conductor track with ground potential. To this end, a switching contact piece usually permanently has ground potential, it being possible for ground potential to be transmitted to a phase conductor by way of an approach of the switching contact pieces toward one another and galvanic contacting thereof. Grounding switches are generally safety devices which are intended to reliably bring about grounding of a phase conductor track. To this extent, a switch-on operation of a grounding switch is to be classed as the more important switching operation. In the case of the use, in particular, of fast-acting grounding switches, that is to say of grounding switches which, for example in the case of a fault, are intended to contribute to a safety switch-off operation, that is to say to forced grounding, as rapid a movement as possible of switching contact pieces which can be moved relative to one another is to be brought about. In order to bring this about reliably, the flow device should be configured in such a way that, in the case of a switch-on operation, forces which retard the switch-on operation are avoided. An additional braking effect by way of the flow device is thus to be avoided. In the case of a switch-on operation, therefore, the control valve should be open and the orifice opening should be open. Conversely, in the case of a switch-off operation on a grounding switch, it is advantageous that the flow device takes its effect. In this regard, in the case of grounding switches or else other electrical switching devices, the control device should be pressed into the sealing position in the switch-off operation, whereas, in the case of a switch-on operation, the sealing position of the control valve should be canceled. For example, a free orifice opening can be utilized in the case of a switch-on operation to fill the flow device with fluid, in particular fluid which is unused, that is to say cooled and is as free from charge carriers as possible, with the result that the flow device is ready for switching again for a switch-off operation. In the case of other switching devices, a reversed effect of the control valve can be advantageous depending on requirements.

In the following text, one exemplary embodiment of the invention will be shown diagrammatically in a drawing and will be described in greater detail subsequently.

DETAILED DESCRIPTION OF THE INVENTION

On the basis of FIGS. 1 to 4, the construction of an electrical switching device and the method of operation of a control device will first of all be described. FIGS. 5 to 19 in each case show details of control valves in three design variants.

Figure 1:
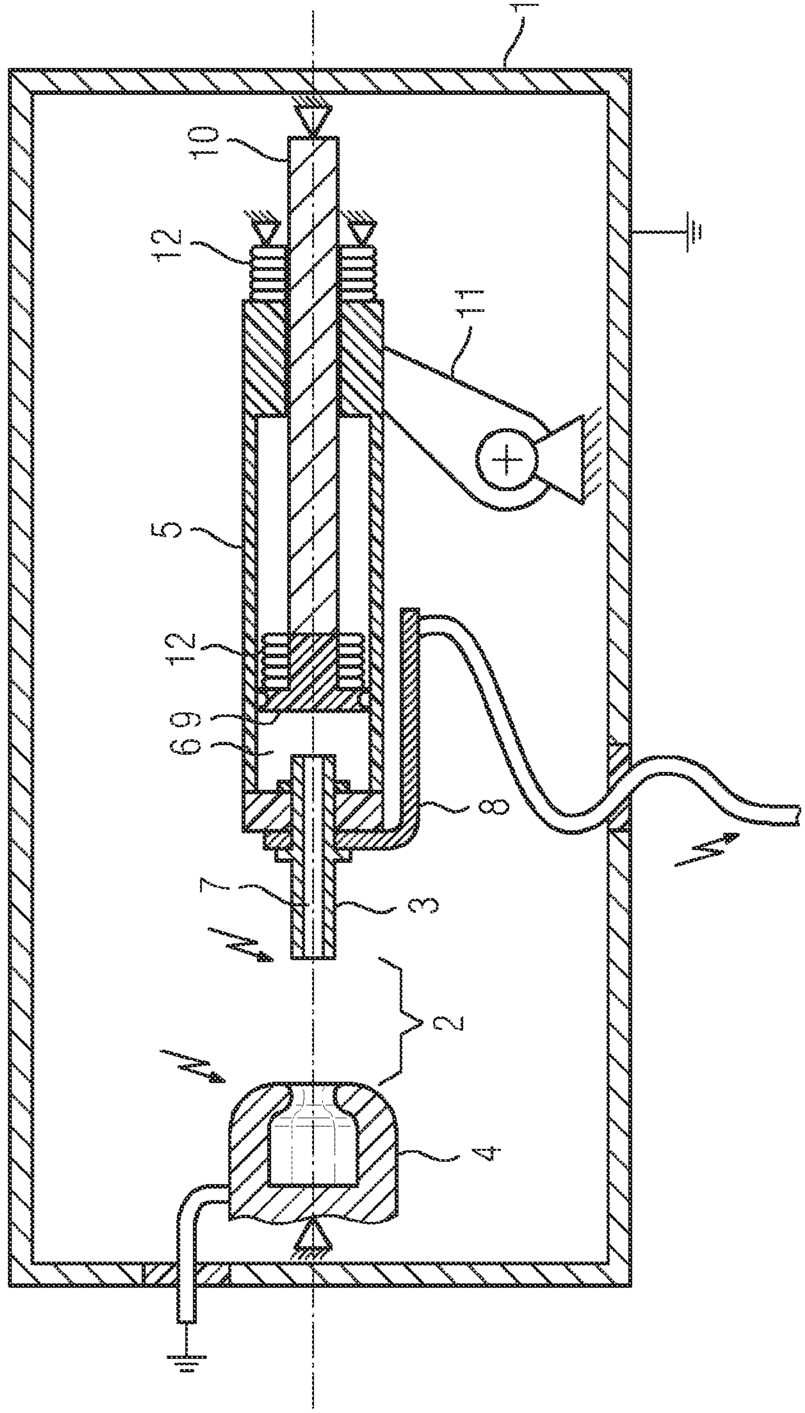
FIG. 1 shows a side view of an electrical switching device in the switched-off state.

FIG. 1 shows a side view of an electrical switching device in section. The electrical switching device comprises an encapsulation housing 1. The encapsulation housing 1 surrounds active parts (live parts) of the electrical switching device, with the result that there is mechanical protection. Furthermore, the encapsulation housing 1 can hermetically enclose active parts of the electrical switching device, with the result that the interior of the encapsulation housing can be filled with an electrically insulating fluid. The encapsulation housing 1 prevents evaporation of the electrically insulating fluid.

The electrical switching device comprises a switching path 2. The switching path 2 extends between a first movable switching contact piece 3 and a second stationary switching contact piece 4. The second switching contact piece 4 is supported on the encapsulation housing 1 in an electrically insulated manner. The encapsulation housing 1 comprises walls made from an electrically conducting material which conduct ground potential. The second switching contact piece 4 likewise has ground potential, a grounding cable of the second switching contact piece 4 being routed to the outside through the encapsulation housing 1 in an electrically insulated manner. As a result, there is the possibility for the second switching contact piece 4 to be disconnected from the ground potential as required. This is advantageous, for example, for inspecting and testing purposes. The first switching contact piece 3 is mounted on a cylinder 5. The cylinder 5 is part of a flow device and delimits a compression volume 6. Here, the first switching contact piece 3 is of hollow-cylindrical configuration and comprises a blowing channel 7 in its interior. The blowing channel 7 opens at the free end of the first switching contact piece 3 in the switching path 2. The other end of the blowing channel 7 opens in the interior of the compression volume 6, with the result that the compression volume 6 can communicate via the blowing channel 7 with the surrounding area, in particular in the region of the switching path 2. The cylinder 5 is mounted movably and is formed from electrically insulating material. Via a connection lug 8 which is arranged between the first switching contact piece 3 and an end side of the cylinder 5, a connector line is guided to the outside in an electrically insulating manner through the wall of the encapsulation housing 1, and can be connected there to a phase conductor track to be grounded. In order to bring about displaceable guidance of the cylinder 5, a piston plate 9 is positioned so as to be seated in a stationary manner on a stem 10. Here, the stem 10 is in turn supported in a stationary manner on the encapsulation housing 1. The piston plate 9 forms a fixed wall on the compression volume 6, with the result that a change in the compression volume 6 is brought about in the case of a relative movement of the piston plate 9 with respect to the cylinder 5. In the case of a switch-on operation, that is to say in the case of an approach of the first switching contact piece 3 to the second switching contact piece 4, an increase in the compression volume 6 takes place. Conversely, in the case of a removal of the switching contact piece 3 from the second switching contact piece 4 (switch-off operation), a reduction in the compression volume 6 takes place. In the case of a switch-off operation, a compression of electrically insulating fluid is thus brought about within the compression volume. Via the blowing channel 7, said electrically insulating fluid is ejected into the switching path 2, and applies flow to, cools and reinforces the switching path 2 there and flows around a possibly burning arc. A relief opening which opens in the compression volume 6 can be switched by way of a control valve 13. The relief opening is advantageously arranged in the stationary piston plate 9. At least one control valve 13 (position, cf. FIG. 2) is arranged in the piston plate 9.

Figure 2:
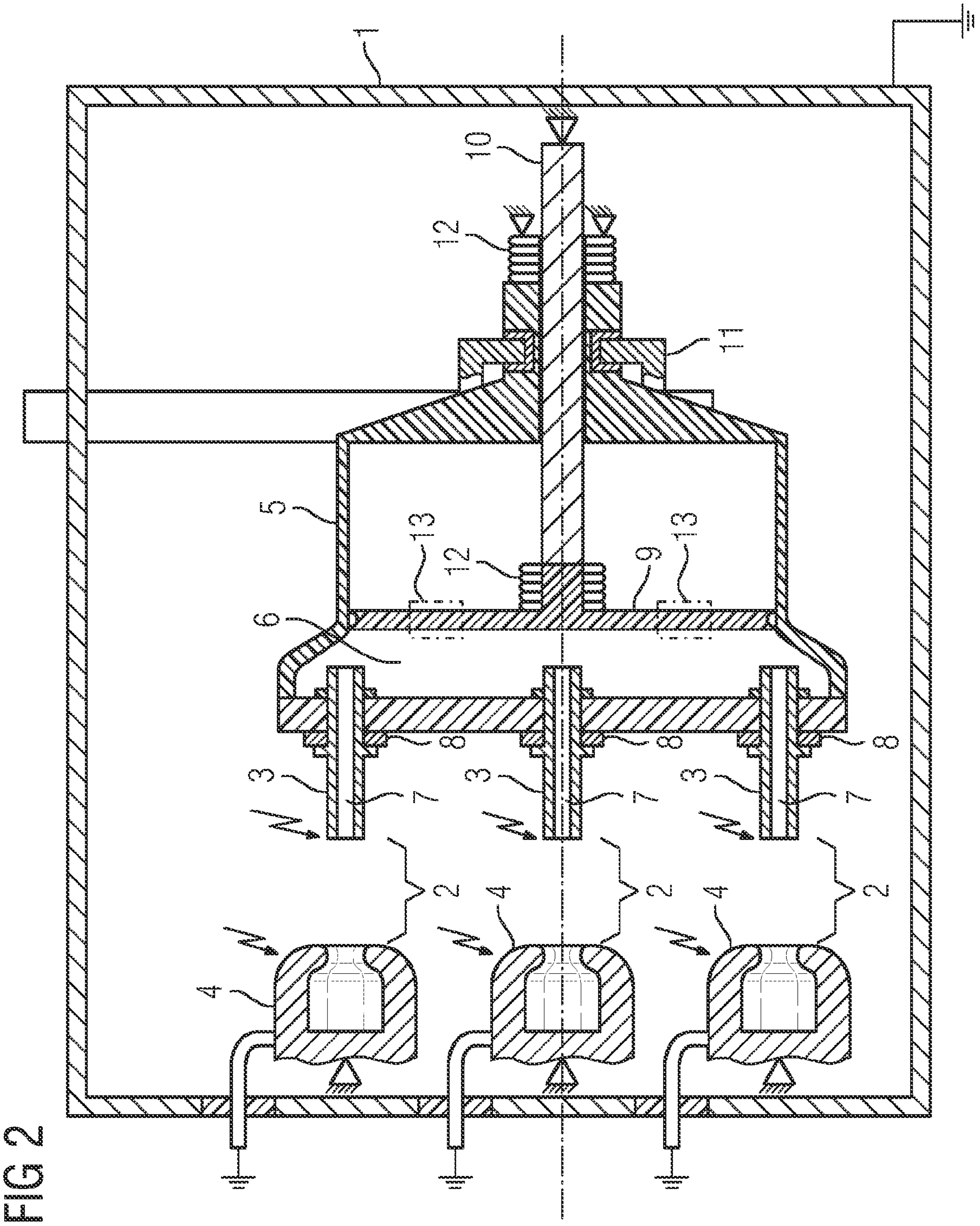
FIG. 2 shows a top view of the electrical switching device known from FIG. 1 in the switched-off state.
Figure 3:
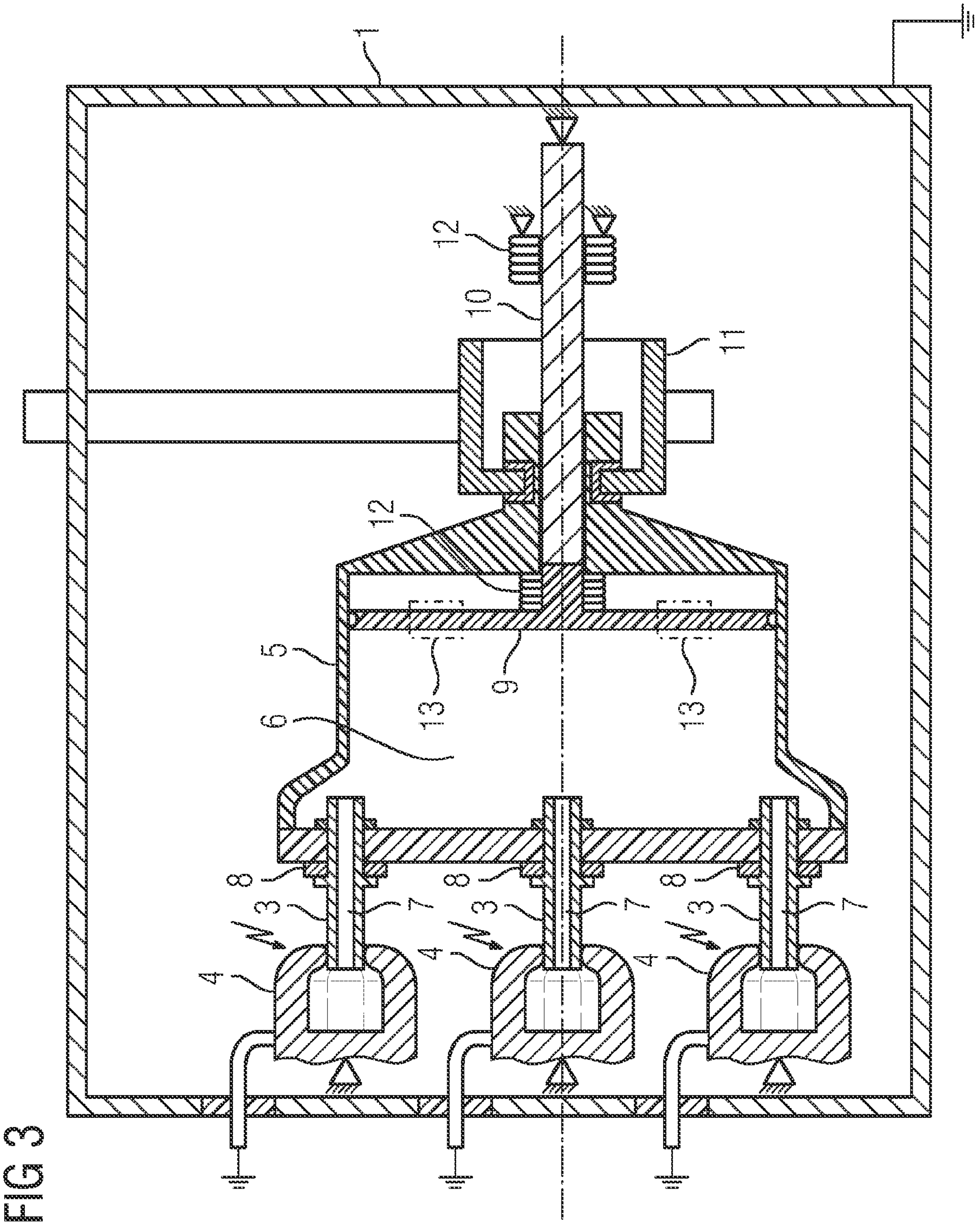
FIG. 3 shows a top view of the electrical switching device as known from FIGS. 1 and 2 in the switched-on state.

In order to bring about a displacement of the first switching contact piece 3 together with the cylinder 5, a rotatably mounted lever arm 11 is provided. The lever arm 11 is guided with its free end in a groove on the cylinder 5, with the result that a pivoting movement can be converted into a linear movement of the cylinder 5 via a pin, engaging into the groove, of the lever arm 11 (cf. FIGS. 2, 3, 4). In order to assist braking of the cylinder 5 in the switch-on and switch-off positions, stop buffers 12 are arranged on the stem 10 which supports the piston plate 9. It can be seen in the top view of FIG. 2 that the switching unit according to FIG. 1 is a multipole switching unit. That is to say, a plurality of first switching contact pieces 3 and a plurality of second switching contact pieces 4 are arranged parallel to one another and are actuated together. Therefore, a switching device, as shown in FIGS. 1 and 2, can be used for switching a multiphase electrical energy transmission system. The piston plate 9 is a substantially rectangular piston plate 9, in which two control valves 13 of identical construction are arranged. The control valves 13 serve to control the filling and emptying of the compression volume 6 with a fluid which is provided for applying a flow to the switching path 2.

Figure 4:
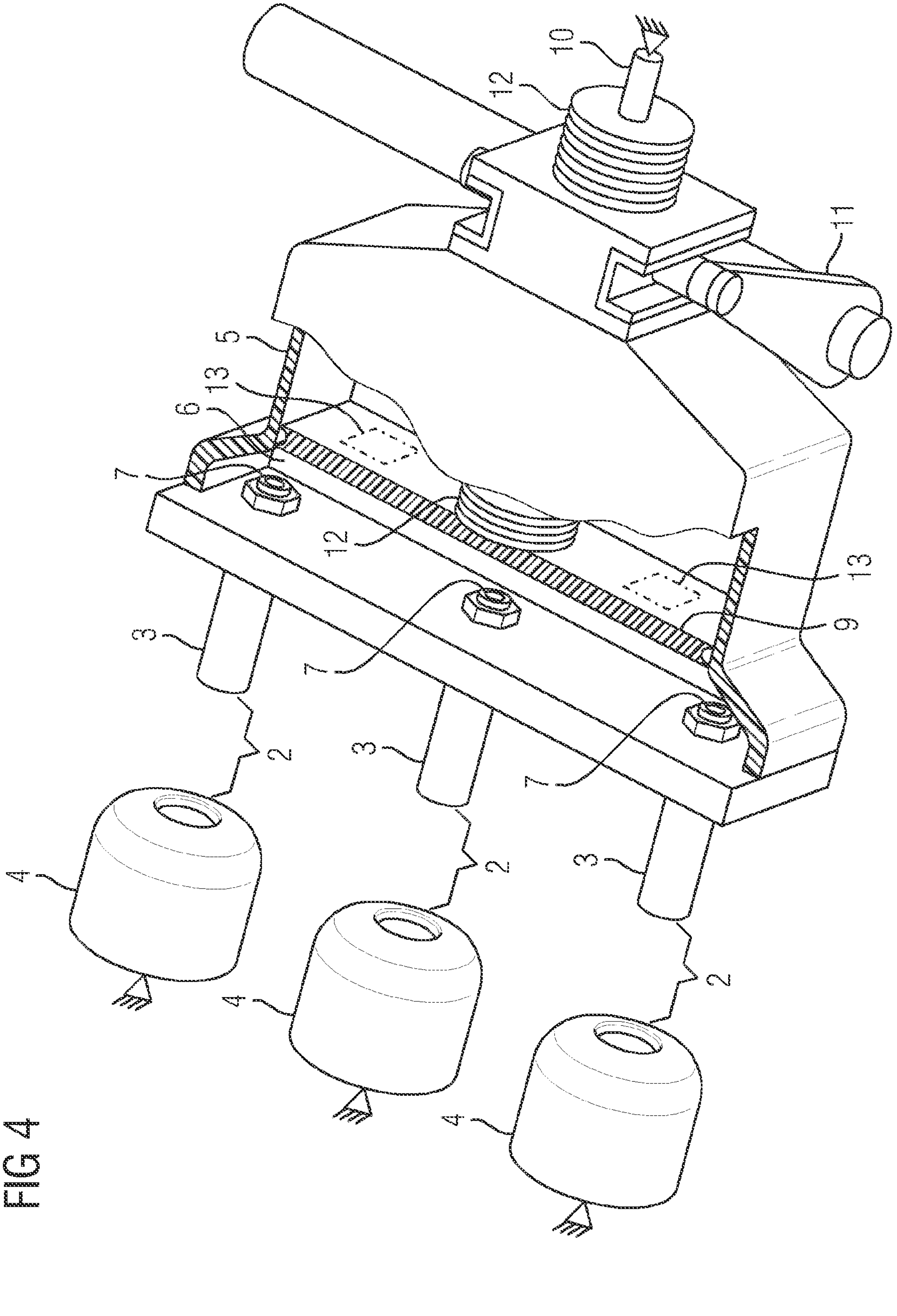
FIG. 4 shows a perspective view of the electrical switching device known from FIGS. 1 to 3 in the switched-off state.
Figure 5:
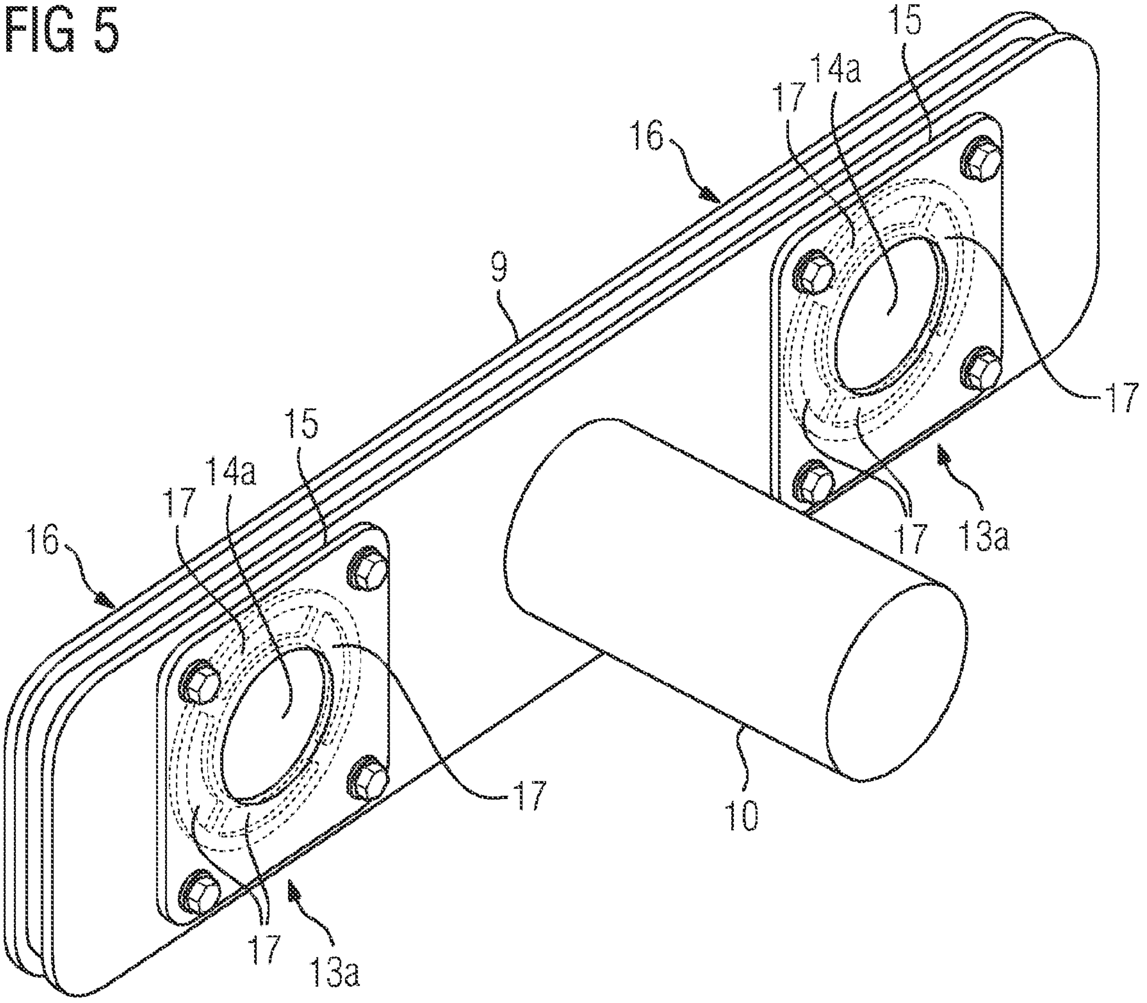
FIG. 5 shows a piston plate with a control valve in a first design variant in a perspective view.
Figure 15:
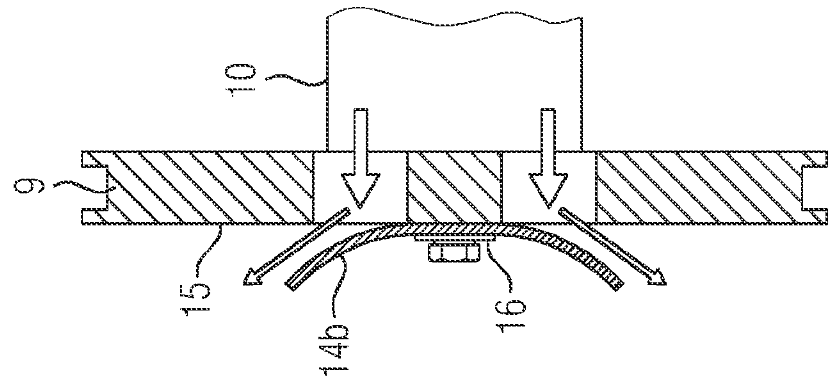
Figure 16:
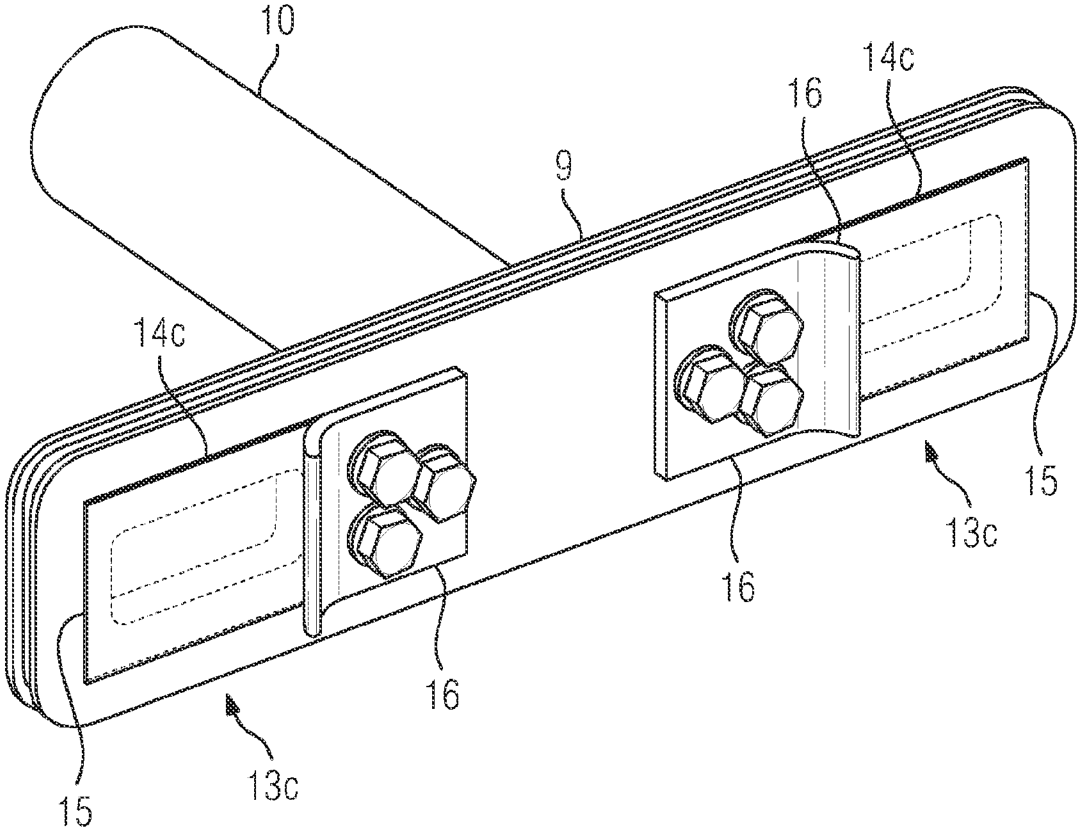
FIG. 16 shows a piston plate with a control valve in a third design variant in a perspective view, and FIGS. 17 to 19 in each case show a section through the control valve in the third design variant known from FIG. 16.

Starting from the switched-off state as shown in FIGS. 1 and 2, a switch-on operation is then first of all to be described. In order to move the first switching contact pieces 3 closer to the second switching contact pieces 4, a rotation of the lever arm 11 is triggered. As a result, the cylinder 5 is moved in the direction of the second switching contact pieces 4. The compression volume 6 increases in the process. Here, the control valves 13 are oriented in such a way that a valve body 14*a*, 14*b*, 14*c* then opens, with the result that an inflow of fluid into the compression volume 6 preferably takes place via the control valves 13. In addition, fluid can also flow in via the blowing channels 7 of the first switching contact pieces 3. In the switched-on state (FIG. 3), the first and the second switching contact pieces 3, 4 are connected to one another in an electrically conducting manner. The compression volume 6 is filled with the greatest possible quantity of electrically insulating fluid. In the case of a switch-off operation (FIG. 3 after FIG. 2), that is to say the first switching contact pieces 3 are disconnected from the second switching contact pieces 4 and moved away from them, a reduction of the compression volume 6 takes place. In order to carry out a switch-off operation, the lever 11 is moved with a changed rotational direction. The stop buffers 12 in each case form stops for the moving cylinder 5, in order to brake the latter in its end positions. The valve bodies 14*a*, 14*b*, 14*c* block the control valves 13, with the result that fluid which is situated within the compression volume 6 has to flow out via the blowing channels 7 of the first switching contact pieces 3 in the direction of the second switching contact pieces 4. As a result, the switching path 2 is flooded with uncontaminated, preferably cool, electrically insulating fluid, with the result that contaminated fluid is pushed out of said region and a possibly present arc is flowed around by the electrically insulating fluid. FIG. 4 shows the position of the control valves 13 in a symbolic manner in the switched-off state. FIGS. 5, 12 and 16 show design variants of possible control valves 13. Here, the associated FIGS. 6 to 11, 13 to 15 and 17 to 19 show the method of operation of the control valves 13 or their valve bodies 14*a*, 14*b*, 14*c*.

Regardless of the structural configuration of the control valves 13, 13*a*, 13*b*, 13*c* with regard to shape, number, etc., their function is selected in each case to be identical, however, for the switching device shown in the figures (grounding switch/fast-acting grounding switch). In the case of a switch-on operation, the control valves 13, 13*a*, 13*b*, 13*c* are switched in such a way that a valve body 14*a*, 14*b*, 14*c* is moved out of its sealing position, with the result that a fluid flow can flow over out of the surrounding area into the interior of the compression volume 6. In the case of a switch-off operation, the valve body 14*a*, 14*b*, 14*c* is pressed into its sealing position, with the result that an outflow of fluid from the compression volume 6 which decreases in size in the case of a switch-off operation takes place via the blowing channels 7 of the first switching contact pieces 3.

Figure 8:
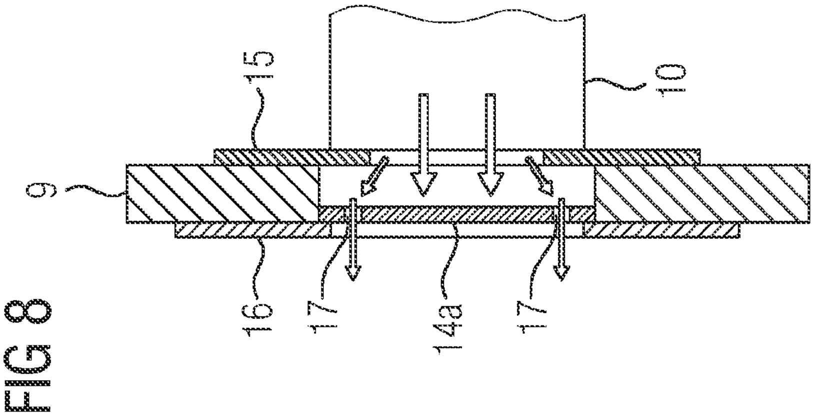
FIGS. 6, 7 and 8 show sections through the piston plate known from FIGS. 1 to 5 with a control valve in a first design variant.
Figure 7:
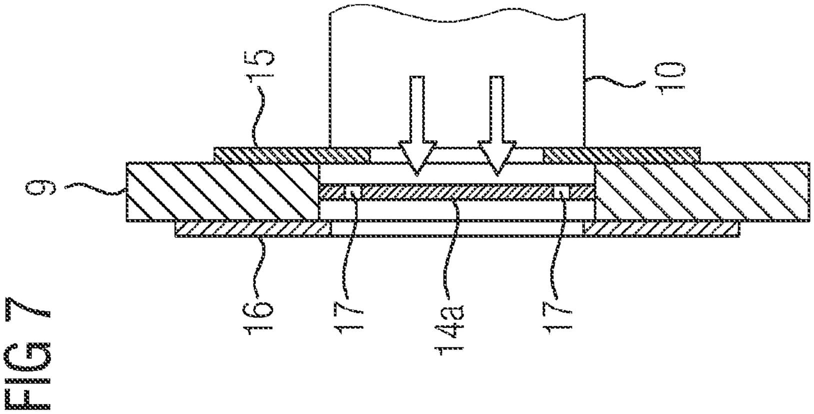
Figure 6:
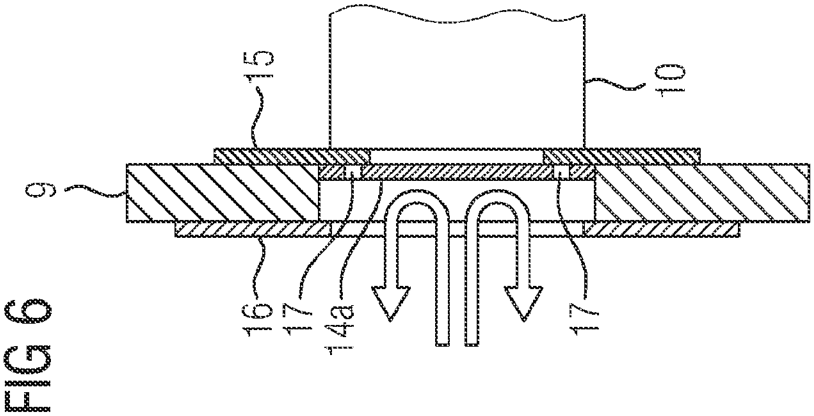

FIG. 5 shows a piston plate 9 with a stem 10 as known from FIGS. 1 to 4. A first design variant of a control valve 13*a* is arranged twice in the piston plate 9, in each case an identical overall design having been selected. The through-flow capability is increased by way of the doubling of the control valves 13*a*. The control valve 13*a* in a first design variant has a substantially cylindrical valve body 14*a* with a circular cross section. The valve body 14*a* of the control valve 13*a* in a first design variant can be moved freely between a first stop 15 and a second stop 16 (cf. FIGS. 6 to 11) in the direction of a displacement axis of the cylinder 5. The valve body 14*a* is mounted displaceably in the manner of a clearance fit between the first and the second stop 15, 16. A plurality of curved slots are arranged distributed on the circumference in the edge region of the valve body 14*a* of the control valve 13*a* in the first design variant, which slots in each case form a through opening 17. Here, the cross section of the first stop 15 is selected in such a way that it completely covers the through openings 17 and, in the case of contact of the valve body 14*a* of the control valve 13*a* in the first design variant, said through openings 17 are blocked or dammed by the first stop 15 (cf. FIG. 6). In contrast to this, the second stop 16*a* is dimensioned in such a way that, on the side which faces away from the observer in FIG. 5, it performs support or contact of the valve body 14*a* of the control valve 13*a* of the first design variant in the edge region, with the result that, in the case of the valve body 14*a* bearing against the second stop 16, the through openings 17 are not then dammed (cf. FIG. 8). FIG. 6 shows the position of the valve body 14*a* during a switch-off operation, that is to say the valve body 14*a* is pressed into its sealing position on the first stop 15. A pressing force is brought about by way of the flow pressure of the flowing fluid which is compressed in the interior of the compression volume 6. As the pressure in the interior of the compression volume 6 increases, the pressing force on the seat of the valve body 14*a* in its sealing position also increases. In the case of a switch-off operation, a directional reversal of the flow pressure takes place (FIG. 7). That is to say, the compression volume 6 is increased, as a result of which the flow pressure of the flowing fluid moves the valve body 14*a* away from the first stop 15 and presses it in the direction of the second stop 16 (FIG. 8). The recesses 17 are then exposed, and fluid can flow over via the recesses 17 of the valve body 14*a* into the interior of the compression volume 6. It is provided in each case in the design variant according to FIGS. 6 to 8 for the first and the second stop 15, 16 to be placed in front of a continuous channel of a relief opening into the piston plate 9, with the result that the substantially cylindrical valve body 14*a* is guided in the manner of a clearance fit between the first and the second stop 15, 16 in a manner which is guided by the inner shell face of the channel in the piston plate 9.

Figure 11:
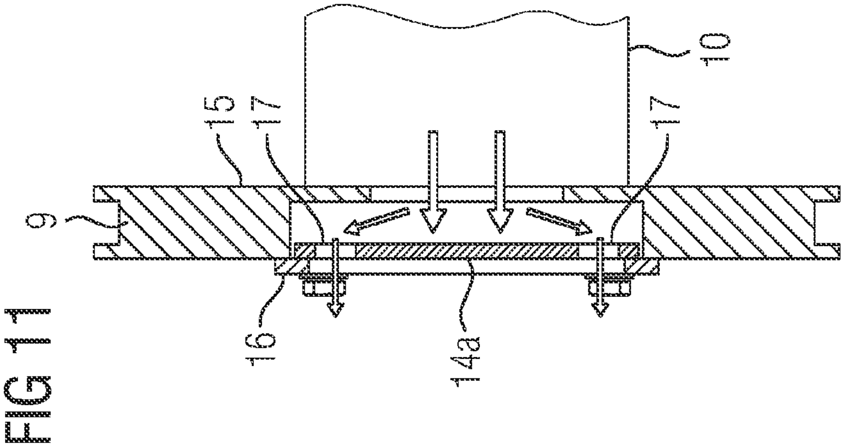
FIGS. 9, 10 and 11 show a modification of the control valve in the first design variant shown in section in FIGS. 6, 7 and 8.
Figure 10:
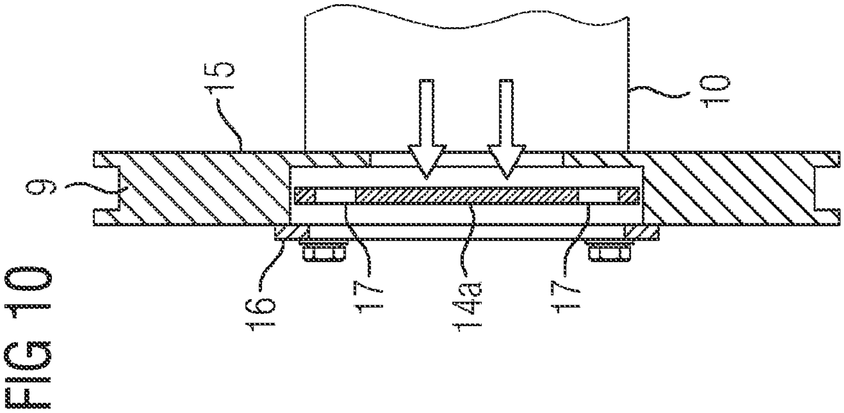
Figure 9:
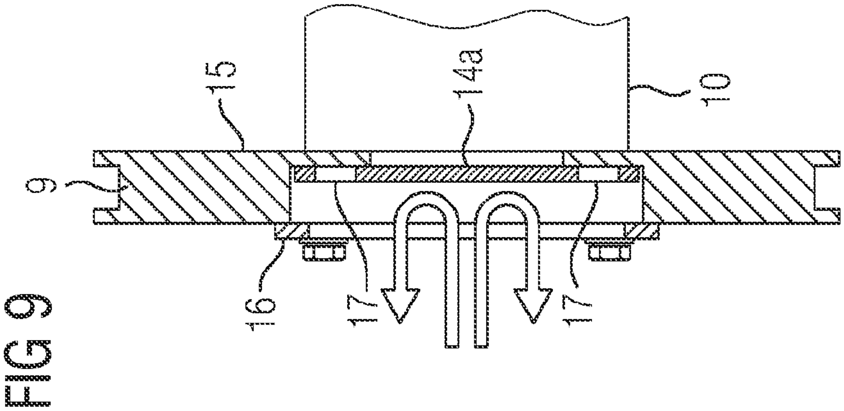
Figure 12:
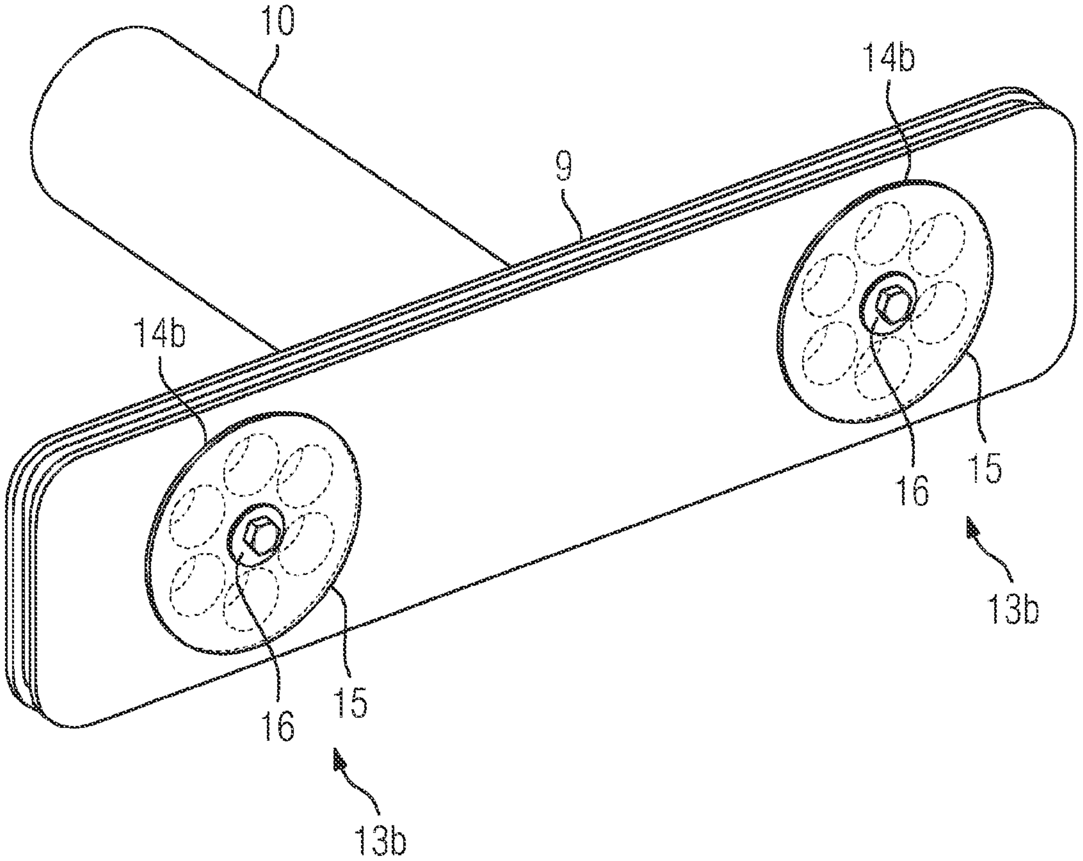
FIG. 12 shows a piston plate with a control valve in a second design variant in a perspective view, FIGS. 13, 14 and 15 in each case show a section through the piston plate together with the control valve in a second design variant.

FIGS. 9 to 11 show an alternative embodiment of a first stop 15. Here, the first stop 15 is formed by way of a shoulder in the channel of the piston plate 9. Merely the second stop 6 is provided by way of a discretely placed plate which can be dismantled in order to introduce the valve body 14*a* into its clearance fit. The function and method of operation are identical, however, to the design variant as shown in FIGS. 6, 7 and 8.

Starting from the piston plate 9, FIG. 12 shows a second design variant of a control valve 13*b*. Two identical control valves 13*b* are once again provided on the piston plate 9. The utilization of an elastically deformable valve body 14*b* is now provided. The elastically deformable valve body 14*b* once again has a cylindrical shape with a circular cross section. The valve body 14*b* of the second design variant of a control valve 13*b* is, however, positioned flatly on that side of the piston plate 9 which faces the compression volume 6. To this end, a central screw connection is provided, a relief opening with a plurality of channels being arranged in the piston plate 9 in the overlap region of the valve body 14*b* of the second design variant 13*b*, which relief opening is covered by the valve body 14*b*. On the basis of FIGS. 13 to 15, the method of operation of the control valve 13*b* in the second design variant is now to be described. During a switch-off operation and while the compression volume 6 is decreasing in size in the process, the flow pressure presses a valve body 14*b* of the second design variant of the control valve 13*b* against the wall (first stop 15) of the piston plate 9, and dams the channels in the piston plate 9. Therefore, in the case of a switch-off operation, the fluid which is situated in the compression volume 6 is pressed through the blowing channels 7 of the first switching contact pieces 3 in the direction of the switching path 2. In the case of a switch-on operation, a reversal of the direction of the flowing fluid takes place. On account of the elastic deformation capability of the valve body 14*b* of the second design variant, the flow pressure than presses said valve body 14*b* out of the sealing seat and lifts it on its free periphery from the piston plate 9. Held centrally by the second stop 16 and deformed elastically, fluid flows into the interior of the compression volume 6 via the channels in the piston plate 9. The valve body 14*b* of the control valve 13*b* in a second design variant is fixed in a punctiform manner by the second stop 16.

Figure 14:
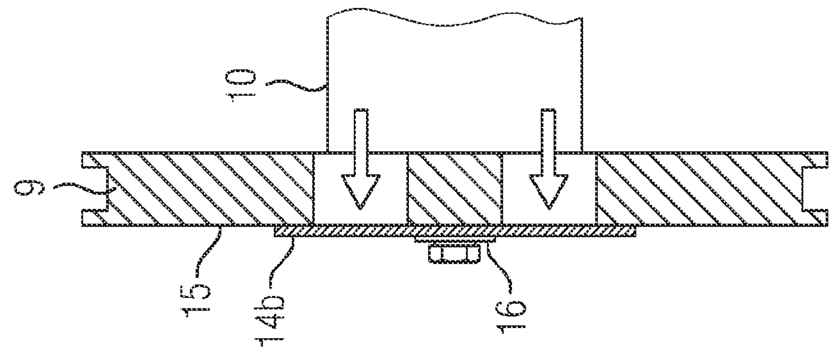
Figure 13:
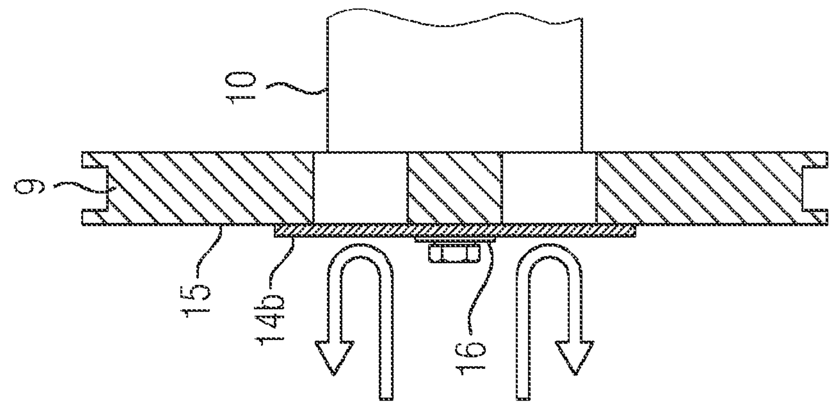
Figure 19:
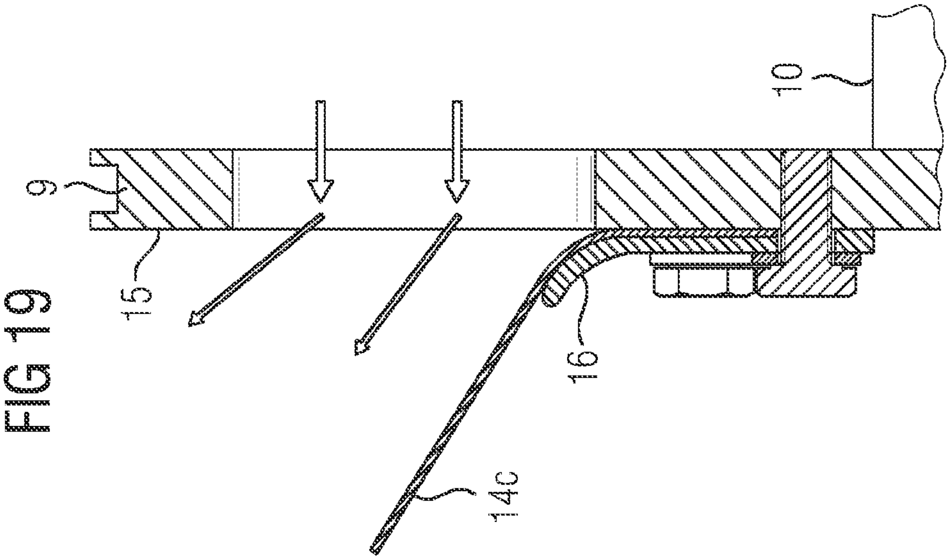
Figure 18:
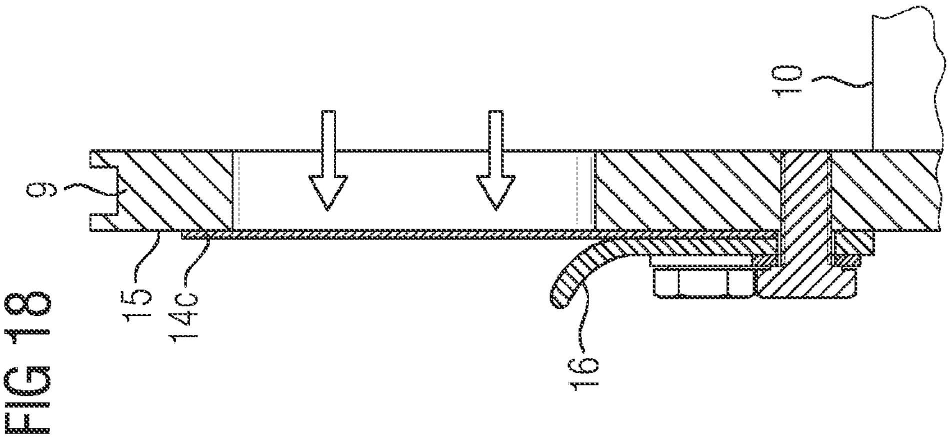
Figure 17:
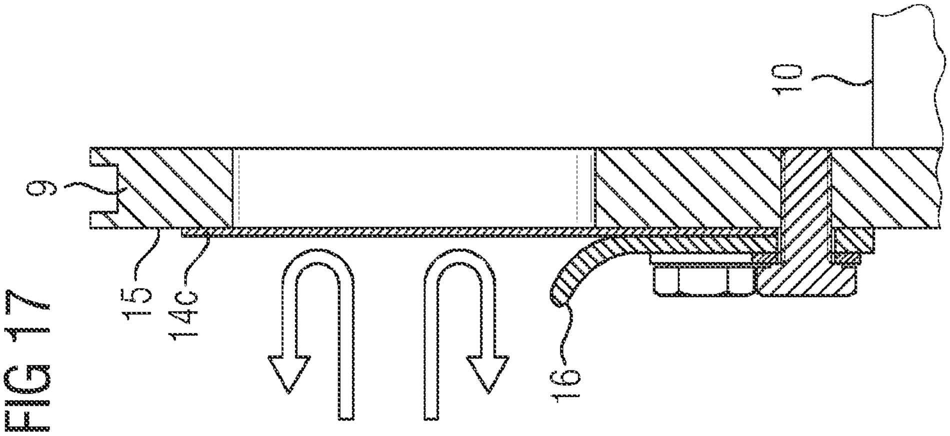

FIG. 16 shows a piston plate 9 with a control valve 13*c* in a third design variant. It is provided in the third design variant for an elastically deformable valve body 14*c* to be clamped in on one side (at the edge), with the result that flap-like opening of the valve body 14*c* of the control valve 13*c* in a third design variant is enabled. A second stop 16 which has a convexly curved stop face serves to fasten the valve body 14*c* in a punctiform manner. As a result, it is possible that the valve body 14*c* of the third control valve 13*c* lifts up from the first stop 15 which is formed by the surface of the piston plate 9, and presses against the second stop 16. Excessive deformation, or mechanical loading, for example notching of the valve body 14*c* of the control valve 13*c* in a third design variant, is prevented on account of the convex curvature of the second stop 16. FIGS. 17, 18, 19 show the method of operation of the control valve 13*c* in the third design variant, in a substantially identically acting manner to what is shown in FIGS. 13, 14 and 15. In the case of a switch-off operation, the compression volume 6 is reduced, whereupon a flow pressure presses the valve body 14*c* of the control valve 13*c* of the third design variant against the first stop 15, the valve body 14*c* completely covering and sealing a relief opening in the piston plate 9 (FIG. 17). The valve body 14*c* is pressed into its sealing position. In the case of a switch-on operation, an increase in the compression volume 6 occurs. Driven by the flow pressure, the valve body 14*c* of the control valve 13*c* in the third design variant is removed from the first stop 15 and is pressed against the second stop 16. Fluids can then flow over via the relief opening in the piston plate 9 into the interior of the compression volume 6.

The invention claimed is:

1. An electrical switching device, comprising:

a switching path;

a flow device with a control valve for applying a flow of a flowing fluid to said switching path;

said control valve having a movable valve body, a first stop, and a second stop;

said valve body being movably disposed in a clearance fit between said first and second stops, and said valve body being formed with a through-opening; and said valve body being configured to be pressed into a sealing position by way of a flow pressure of the flowing fluid wherein said through-opening is sealed closed by one of said first or second stops in the sealing position.

2. The electrical switching device according to claim 1, wherein said valve body is elastically deformable.

3. The electrical switching device according to claim 1, wherein said valve body is spatially fixed.

4. The electrical switching device according to claim 3, wherein said valve body is spatially fixed at least at one point.

5. The electrical switching device according to claim 1, wherein one of said first and second stops is configured to spatially fix said valve body.

6. The electrical switching device according to claim 1, wherein one of said first and second stops is formed with a convex stop face for said valve body.

7. The electrical switching device according to claim 1, wherein said control valve is positioned in a stationary position relative to said switching path.

8. The electrical switching device according to claim 1, wherein the electrical switching device is a grounding switch.

9. The electrical switching device according to claim 8, configured as a fast-acting grounding switch.

* * * * *